Dec. 8, 1925.                                    1,564,355
H. JUNKERS
FLYING MACHINE
Filed Feb. 2, 1921
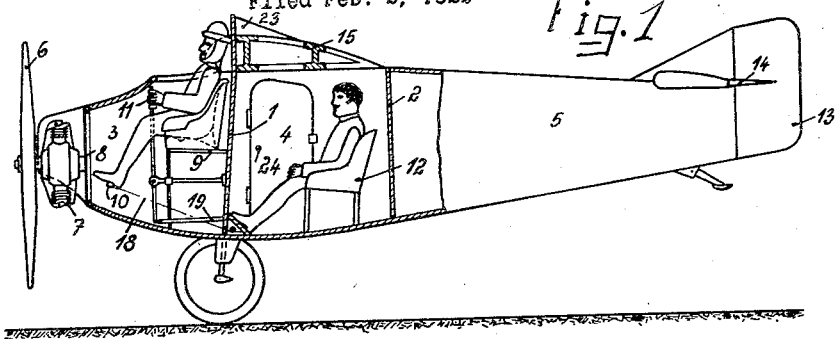
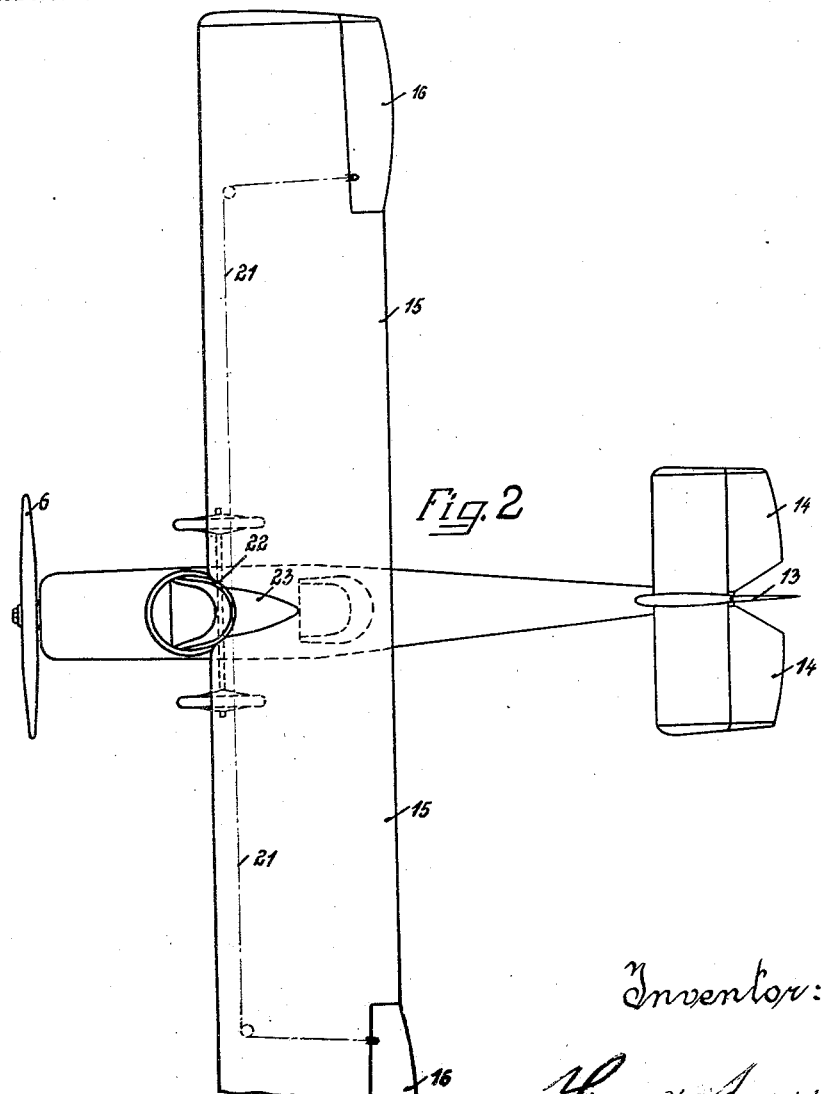
Inventor:
Hugo Junkers Patented Dec. 8, 1925.

1,564,355

UNITED STATES PATENT OFFICE.

HUGO JUNKERS, OF DESSAU, GERMANY.

FLYING MACHINE.

Application filed February 2, 1921. Serial No. 441,965.

*To all whom it may concern:*

Be it known that I, HUGO JUNKERS, a citizen of Germany, residing at Dessau, Germany, have invented certain new and useful Improvements in Flying Machines, of which the following is a specification.

My invention refers to flying-machines, and more especially to the distribution of the various loads carried in such machines.

In the drawings affixed to this specification and forming part thereof, a flying-machine embodying my invention and having the supporting plane arranged in an elevated position, is illustrated diagrammatically by way of example. In the drawings Fig. 1 is a longitudinal section, while Fig. 2 is a plan view.

Referring to the drawings the body of the flying-machine is divided by two transverse partitions 1, 2 into the forward compartment 3, the middle compartment 4 for the useful load, and the rear or tail compartment 5. The forward compartment 3 contains a star-shaped rotary motor 7 arranged directly behind the traction propeller 6 together with the pertinent supporting frame. The driver's seat 9 including the pedal 10 operating the vertical rudder for azimuth steering, and the hand lever 11 serving to control the horizontal rudder for altitude steering as well as the balancing planes at the ends of the forward wings, are also contained in the forward compartment and follow immediately upon the engine. These steering levers are connected with the tail rudders by means of transmission ropes 18 and rods 19, whilst the transmission ropes 21 lead to the balancing-planes 16 at the ends of the supporting plane 15.

The middle compartment 4 containing the useful load is fitted with seats 12 for the passengers.

The driver's seat 9 is raised so far as to allow the steering pedal ample play in the front part 3 of the body which curves upwards, thus simultaneously bringing the head of the driver into a position approximately on a level with that of the supporting plane so that the view of the driver is unimpaired in all directions. In the middle of the front edge of the supporting plane a recess 22 is formed of a size sufficient to accommodate the head and upper part of the trunk of the driver. A wind screen 23 is fitted on the supporting plane in order to protect the projecting part of the head of the driver, besides guiding the air in a suitable manner.

It will be seen from the drawing that only those loads which are inherent in the flying-machine as it is, and which consists in the forward part 3 of the body with the engine 7 and the driver on the one hand, and in the tail part with its constructional members on the other hand, are situated at a considerable distance from the centre of buoyancy which is assumed to be in 24. The middle compartment 4 on the other hand is in the closest proximity of the centre of buoyancy 24, so that differences in the load contained in compartment 4, can call forth no essential alterations in the state of equilibrium, even though the loads vary between no-load and full load. In this arrangement the position of the main load immediately behind the centre of buoyancy 24 is of very favourable influence in preventing the loaded flying machine from being down much in the tail. Thus the tail planes 14 are automatically made to assist in carrying the increased load, whilst simultaneously also increasing the angle of inclination of the supporting plane 15 owing to the flying machine as a whole being brought into a steeper position.

Depending on circumstances, a lower supporting plane can be added to the flying machine in the usual manner, thus changing the monoplane into a biplane.

As can be guessed from the example illustrated in the drawings, it is essential that the engine as well as the driver's seat be arranged ahead of the supporting plane, whilst the space serving to accommodate the useful load, such as passengers for instance, is located as near the supporting plane as possible. This distribution ensures the longitudinal equilibrium of the flying machine with loads which, like the engine and the driver, to always remain the same, whilst the useful loads, which are nil in the case of the machine flying unloaded for instance, are placed so near the centre of buoyancy of the supporting plane as to cause only a very minimum shifting of the centre of gravity. This shifting of the centre of gravity moreover takes place in a very favorable manner inasmuch as the flying machine is given a tendency to be down in the tail which increases with the growth of the loads, besides increasing the angle of inclination of the supporting planes and in consequence thereof the carrying capacity of the flying machine. This arrangement can be utilized and developed with particular advantage, when employing supporting planes situated high up with the useful loads arranged beneath them.

The accommodation of the driver and the engine ahead of the supporting plane without bringing the flying machine down too much in the head, is moreover facilitated in a very advantageous manner by employing a star-shaped motor or any other of the well known types of engines of particularly short overall length. By locating such an engine in a suitable manner in front of the driver's seat and quite close up to it, the loads ahead of the supporting plane are moved close up to one another too, the weight of the rear part of the body of the flying machine therefor sufficing to balance the weight of the said forward parts.

It is furthermore of considerable advantage to arrange the driver's seat at a certain height, inasmuch as this measure contributes towards keeping the forward part of the flying machine short, besides affording the driver free view in spite of the supporting plane having an elevated position. This arrangement enables the driver to look across the supporting plane, whilst simultaneously allowing of accommodating the steering mechanism in front of the seat and within the rising and tapering floor part of the body of the aeroplane. The wind screen disposed on the upper surface of the supporting plane offers the protection required for the head of the driver which projects above the supporting plane, the said screen at the same time serving to reduce the air resistance.

The recess for the reception of the trunk of the driver, provided in the front edge of the supporting plane serves for moving the load of the engine and the driver particularly close up to the plane.

I claim:

1. In a flying machine of the monoplane type in combination, a supporting plane, a fuselage, a motor, a driver's seat and a compartment for the accommodation of the useful load, all disposed in said fuselage, said motor and seat substantially in front of said plane, said compartment substantially between vertical planes extending through the front and rear edges of said supporting plane, respectively, the tail of said fuselage being arranged to counterweigh said motor and a driver.

2. In a flying machine of the monoplane type in combination, a supporting plane, a motor, a driver's seat and a compartment for the accommodation of the useful load, said motor and said seat being disposed substantially in front of said supporting plane, and a hood being arranged on said supporting plane to the rear of said seat.

3. In a flying machine of the monoplane type in combination, a supporting plane, a motor, a driver's seat and a compartment for the accommodation of the useful load, said motor and said seat being disposed substantially in front of said supporting plane, an indenture being provided in said supporting plane behind said seat.

4. In a flying machine of the monoplane type in combination, a supporting plane, a motor, a driver's set and a compartment for the accommodation of the useful load, said motor and said seat being disposed substantially in front of said supporting plane, an indenture being provided in said supporting plane behind said seat and a hood being arranged on said plane near said indenture.

In testimony whereof I affix my signature.

HUGO JUNKERS.